March 22, 1960 W. A. INGELS 2,929,326
LIQUID METAL PUMPS
Filed June 28, 1955
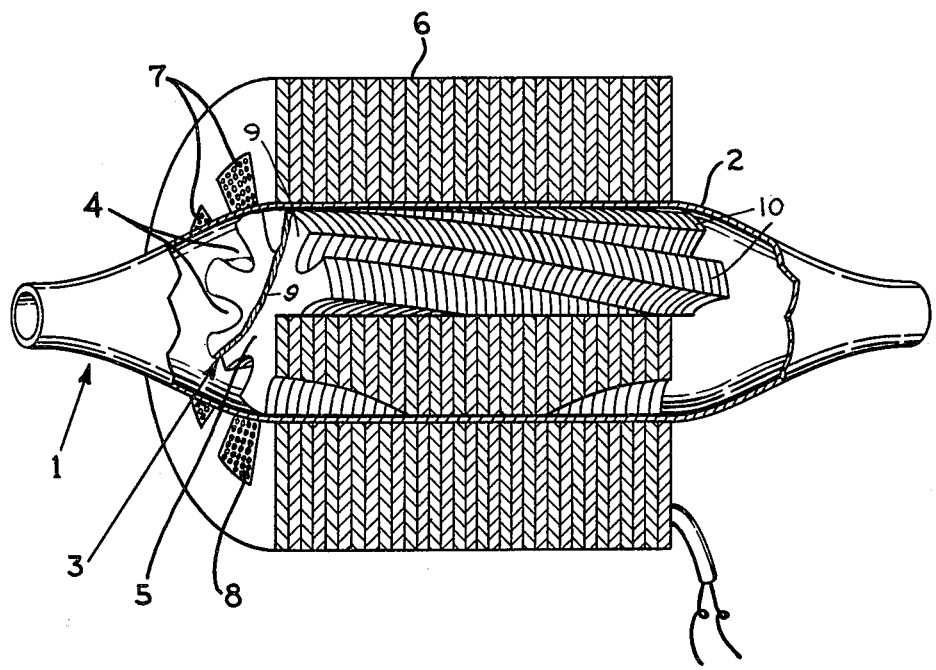
INVENTOR.
WARD A. INGELS
BY
ATTYS.

2,929,326

LIQUID METAL PUMPS

Ward A. Ingels, Glen Burnie, Md.

Application June 28, 1955, Serial No. 518,707

3 Claims. (Cl. 103—1)

(Granted under Title 35, U.S. Code (1952), sec. 266)

The invention described herein may be manufactured and used by or for the Government of the United States of America for governmental purposes without the payment of any royalties thereon or therefor.

This invention relates to liquid metal pumps and more particularly to multiphase electromagnetic induction pumps for pumping electrically conductive fluids by magnetic force.

In general, two types of electromagnetic liquid pumps are known. One type consists of a fixed magnetic field passed through the conductive liquid to be pumped and a high direct current conducted through the conductive liquid at right angles to the magnetic flux. The resultant force produced in the conductive fluid is at right angles to both the magnetic flux and the current flow. This force is along the axis of the conductive fluid which causes the conductive fluid to flow as a result of that force.

In the other general type of conductive fluid pump a multiphase electromagnet, or rotating permanent magnets, are used surrounding a conduit conducting a conductive fluid to induce currents in the fluid producing forces to set the conductive fluid in circular rotation. The conduit at this pumping portion is contoured to take advantage of the rotatable inertia of the conductive fluid to conduct it to an outlet during its high speed flow from the centrifugal force or energy therein.

The principal disadvantages of these general types are that they require considerable bulk or size and are quite inefficient as a result of heat loss. In the conductive type considerable heat is generated since a low voltage source capable of producing a very high current is necessary. In the induction type heat is generated by the friction caused by the centrifugal force of the conductive fluid on the wall of the conduit causing a heat loss as well as a mechanical friction loss. The large air gap in the flux circuit also necessitates considerable power to produce the required flux.

In accordance with the present invention a polyphase field winding on a laminated field core member is placed over a conductive fluid conduit. A laminated core member is fixed by any suitable means within the conductor concentrically within the field winding and field core. The central core member has parallel spiral channels arranged substantially longitudinally in the outer cylindrical periphery thereof. This central core member is covered with a suitable refractory and electrical insulating material. The several channels form passages with the conduit wall through which the conductive fluid passes from the inlet to the outlet of the conduit. The device of this invention operates similar to a squirrel-cage motor except that the central core, resembling the rotor, is fixed and the conductors of conductive fluid are forced in a uniform direction. The air gaps are no greater than the thickness of the conduit wall. The number of slots and poles can be chosen for the desirable frequency used. By this structure a very efficient pump with low heat loss is produced in a compact manner. It is therefore a general object of this invention to provide an efficient and compact polyphase electromagnetic induction conductive fluid pump for pumping the conductive fluid in substantially a continuously forward direction without any substantial heat or frictional losses.

These and other objects, advantages, features, and uses will become more apparent as the description proceeds when taken in consideration of the single figure of drawing illustrating the preferred form of the invention in isometric cross-section.

Referring more particularly to the single figure of the drawing, a conduit 1 for conducting an electrical conductive fluid, as mercury or the like, has an enlarged diameter portion 2 therein between the inlet and the outlet. The conduit 1 may be of any suitable electrically non-conductive material or material of low conductivity. Within the conduit in the enlarged portion 2 is a cylindrical laminated core member, generally referred to by the reference character 3. In the outer cylindrical wall of the core 3 are a plurality of channels or passages 4 all arranged substantially longitudinally in spaced parallel skewed relation, as illustrated, leaving land portions 10 on the outer cylindrical wall thereof. The core member 3 may be fixed within the enlarged portion 2 of the conduit 1 in any well-known suitable manner as by a press fit, fusion of the material, brazing or welding, or the like. The core member 3 is covered on its ends 5 and in the channels 4 with a suitable refractory coating material 9, such as zirconia, or the like, to withstand the heat of the conductive fluid and the corrosive action thereof, if any, as well as to electrically insulate the conductive fluid from the core member 3. This material 9 may be fused with the conduit wall to fixedly support or to assist in fixedly supporting the core member in the enlarged portion 2. The total cross-sectional area of the channels or passages 4 is substantially equal to the cross-sectional area of the conduit 1 before entering the enlarged portion 2.

Snugly fitted over the enlarged portion 2 of the conduit 1 is a stator or polyphase laminated field core member 6 having a plurality of slots 7 therein in which are supported the polyphase windings 8. The field core member 6 may be held on the enlarged portion 2 of conduit 1 by any suitable retaining means (not shown) or held thereon by a press fit. The conductive fluid can be pumped in either direction depending on the arrangement of the polyphase windings 8 or the skew of the core channels 4.

In operation, for the purpose of example, let it be assumed that the conductive fluid is to be pumped from left to right through the conduit 1. Upon energization of the polyphase windings 8 a rotating field is produced to induce a voltage in the conductive fluid in the channels. The conductive fluid acts as a conductor, each conductor forming a short circuit turn beneath the magnetic pole. The short circuit turn is established by the conductive fluid through adjacent channels joined across the ends of the inner core member 3. The current induced in the conductive fluid, in this example, will cause the fluid to apply a force in a direction which would tend to rotate the inner core 3 in a clockwise direction as seen from the left of the figure. Since the inner core is fixed or locked against rotation, a resultant force on the conductive fluid as a result of the skewed channels or passages 4 will force the conductive fluid to slide out of the channels or passages 4 to the right of the figure. Inasmuch as all of the channels 4 are skewed in parallel relation, there will be uniform conductive fluid flow through all of the channels 4 and out the conduit 1 to the right of the figure. The conductive fluid forced out will cause more conductive fluid to be drawn in through the inlet producing a continuous pumping action.

While a rotating magnetic field may be accomplished by mechanically rotating permanent magnets on the exterior of the conduit 1 enlarged portion 2, an alternating voltage polyphase power source provides a simpler and more compact device and this power source is usually always available. Where polyphase power sources are inadequate or unavailable, a shaded pole single phase alternating current device may be used on the field core 6, if desired. All such rotating field devices are within the contemplation of this invention.

While many other modifications and changes may be made in the constructional details and features of this invention without departing from the spirit of the invention, the description and drawing are illustrative of the preferred form of the invention only and I desire to be limited only by the scope of the appended claims.

I claim:

1. A liquid metal induction pump comprising: a conduit for conducting an electrically conductive liquid metal therethrough, said conduit having an enlarged diameter portion therein; an elongated laminated cylindrical core member in said enlarged portion and fixed against rotational movement with respect to said conduit, said core member having a plurality of channels in the outer cylindrical wall of said core member arranged substantially longitudinally in skewed parallel relation forming skewed passages and lands with the wall of said enlarged portion of said conduit to fix said core member in said conduit by said lands; a field core member fixed on said enlarged portion of said conduit coextensive with said elongated cylindrical core member and having a plurality of longitudinal slots extending the entire length thereof; and a plurality of windings disposed in said longitudinal slots for producing a magnetic field across said enlarged diameter portion whereby currents may be induced in liquid metal in said skewed passages to produce a force tending to rotate said cylindrical core member resulting in a force uniformly acting on said liquid metal to move said liquid metal in one direction through said conduit.

2. A liquid metal induction pump as set forth in claim 1 wherein said field core member is laminated.

3. A liquid metal induction pump as set forth in claim 1 wherein the cross-sectional area of all said skewed passages is substantially equal to the cross-sectional area of said conduit removed from said enlarged portion.

References Cited in the file of this patent

UNITED STATES PATENTS

| | | |
|---|---|---|
| 1,298,664 | Chubb | Apr. 1, 1919 |
| 2,651,258 | Pierce | Sept. 8, 1953 |
| 2,658,452 | Donelian | Nov. 10, 1953 |
| 2,702,004 | Blake et al. | Feb. 15, 1955 |
| 2,716,943 | Vandenberg | Sept. 6, 1955 |
| 2,770,196 | Watt | Nov. 13, 1956 |
| 2,786,416 | Fenemore | Mar. 26, 1957 |

FOREIGN PATENTS

| | | |
|---|---|---|
| 239,816 | Switzerland | Mar. 1, 1946 |
| 345,574 | Great Britain | Mar. 26, 1931 |
| 543,214 | Germany | Feb. 3, 1932 |
| 558,624 | France | May 29, 1923 |
| 973,645 | France | Sept. 20, 1950 |